United States Patent
Hosoya

(10) Patent No.: US 6,656,634 B2
(45) Date of Patent: Dec. 2, 2003

(54) NON-AQUEOUS ELECTROLYTIC SECONDARY CELL

(75) Inventor: Yosuke Hosoya, Fukushima (JP)

(73) Assignee: Sony Corporation, Tokyo (JP)

( * ) Notice: Subject to any disclaimer, the term of this patent is extended or adjusted under 35 U.S.C. 154(b) by 174 days.

(21) Appl. No.: 09/749,982

(22) Filed: Dec. 27, 2000

(65) Prior Publication Data

US 2001/0036579 A1 Nov. 1, 2001

(30) Foreign Application Priority Data

Dec. 27, 1999 (JP) .......................... P11-369266

(51) Int. Cl.$^7$ .............................................. H01M 4/58
(52) U.S. Cl. ................... 429/218.1; 429/231.1; 429/300; 429/312; 429/316; 429/322; 429/323; 429/326; 429/330; 429/332; 429/338; 429/231.8; 429/232; 429/233
(58) Field of Search .................. 429/231.1, 300, 429/312, 316, 322, 323, 326, 330, 332, 338, 218.1, 231.8, 232, 233

(56) References Cited

U.S. PATENT DOCUMENTS

| | | | | |
|---|---|---|---|---|
| 5,714,282 A | * | 2/1998 | Tagawa | 429/231.8 |
| 6,099,990 A | | 8/2000 | Denton, III et al. | 429/231.8 |
| 6,395,419 B1 | * | 5/2002 | Kuwahara et al. | 429/231.95 |

FOREIGN PATENT DOCUMENTS

| | | |
|---|---|---|
| WO | WO 98 13887 | 4/1998 |
| WO | WO 99 33132 | 7/1999 |

* cited by examiner

*Primary Examiner*—Laura Weiner
(74) *Attorney, Agent, or Firm*—Sonnenschein, Nath & Rosenthal LLP

(57) ABSTRACT

A non-aqueous electrolytic cell having a positive electrode, which has a positive electrode active material layer containing, at least a positive electrode active material; a negative electrode, which has a negative electrode active material layer containing, at least, a negative electrode active material; and an electrolyte, wherein a sulfur compound is added to at least one of the positive electrode active material and/or the negative electrode active material.

22 Claims, 1 Drawing Sheet

NON-AQUEOUS ELECTROLYTIC SECONDARY CELL

RELATED APPLICATION DATA

The present application claims priority to Japanese Application No. P11-369266 filed Dec. 27, 1999, which application is incorporated herein by reference to the extent permitted by law.

BACKGROUND OF THE INVENTION

This invention relates to a non-aqueous electrolytic cell comprising a positive electrode, a negative electrode and an electrolyte.

In recent years, a diversity of electronic appliances and devices have appeared, with their miniaturization, cordless tendency and weight saving being in progress. This, in turn, requires a higher capacity and more weight saving with respect to cells, particularly, those cells using non-aqueous electrolytes, for use as a power supply for driving the electronic devices.

Cells making use of doping•de-doping of lithium, e.g. so-called lithium ion secondary cells, ensure an energy density larger than lead storage batteries or nickel-cadmium batteries that are conventional secondary cells using aqueous electrolytic solutions. Accordingly, many studies and developments of lithium ion secondary cells have been extensively made at present.

Recently, lithium ion secondary cells have wide utility as a power supply for driving electronic appliances employed not only in a normal temperature environment, but also in a high temperature environment. This places importance on the stability of the cell employed in a high temperature environment.

In order to assure the cell stability in a high temperature environment, there have been proposed a non-aqueous electrolytic secondary cell wherein a positive electrode active material is so defined with respect to its average particle size that the area of contact between an electrolytic solution and the positive electrode active material decreases (Japanese Patent Laid-open No. Hei 9-283144) and a non-aqueous electrolytic secondary cell wherein part of constituent elements of a positive electrode active material is replaced by a different type of element (Japanese Patent Laid-open No. Hei 11-7958).

However, these cells are disadvantageous in that since the specific character of the positive electrode active material per se is altered, then inherent cell characteristics may be degraded, and limitation is placed on an application only to a positive electrode active material capable of substituting part of a constituent element with a different type of element.

Moreover, there has been proposed a non-aqueous electrolytic secondary cell using a flame-retardant non-aqueous electrolytic solution (Japanese Patent Laid-open No. Hei 8-37025). For fabrication of larger-sized cells and extension of an application range, higher stability for the cell is demanded.

In the lithium ion secondary cells, lithium and transition metal composite oxides such as $LiCoO_2$, $LiNiO_2$ and the like are used as a positive electrode active material.

It is well known that the positive electrode active material containing a lithium•transition metal composite oxide decreases in stability in a state where the cell is charged so that lithium ions are withdrawn and that when the electrode active material is heated in this state, the material releases active oxygen (see, for example, Solid State Physics, 69, 265 (1994)).

This active oxygen combines with an electrolyte to form an active peroxide intermediate, thereby decomposing the electrolyte in chain reaction. Eventually, heat is generated inside the cell.

Thus, the non-aqueous electrolyte secondary cell using these positive electrode active material has the problem on the stability when charged and discharged under high temperature environmental conditions.

SUMMARY OF THE INVENTION

It is accordingly an object of the invention to provide a non-aqueous electrolytic cell which overcomes the prior-art problems.

It is another object of the invention to provide a non-aqueous electrolytic secondary cell which exhibits a high capacity and good stability when charged and discharged under high temperature environmental conditions.

The above objects can be achieved, according to the present invention, by a non-aqueous electrolytic cell, which comprises a positive electrode having a positive-electrode-mix layer containing, at least, a positive electrode active material, a negative electrode having a negative-electrode-mix layer containing, at least, a negative electrode active material, and a non-aqueous electrolyte wherein a sulfur compound is added to at least one of the positive-electrode-mix layer, the negative-electrode-mix layer and the non-aqueous electrolyte.

The non-aqueous electrolytic cell of the invention having such an arrangement as described above should have a sulfur compound added to at least one of the positive-electrode-mix layer, the negative-electrode-mix layer and the non-aqueous electrolyte wherein the sulfur compound is able to decompose a peroxide intermediate formed during the course of charge and discharge in a high temperature environment. Thus, the electrolyte is suppressed from being decomposed.

BRIEF DESCRIPTION OF THE DRAWING

The sole FIGURE is a schematic sectional view showing a non-aqueous electrolytic secondary cell according to the present invention.

DETAILED DESCRIPTION OF THE PREFERRED EMBODIMENTS

Figure 1:
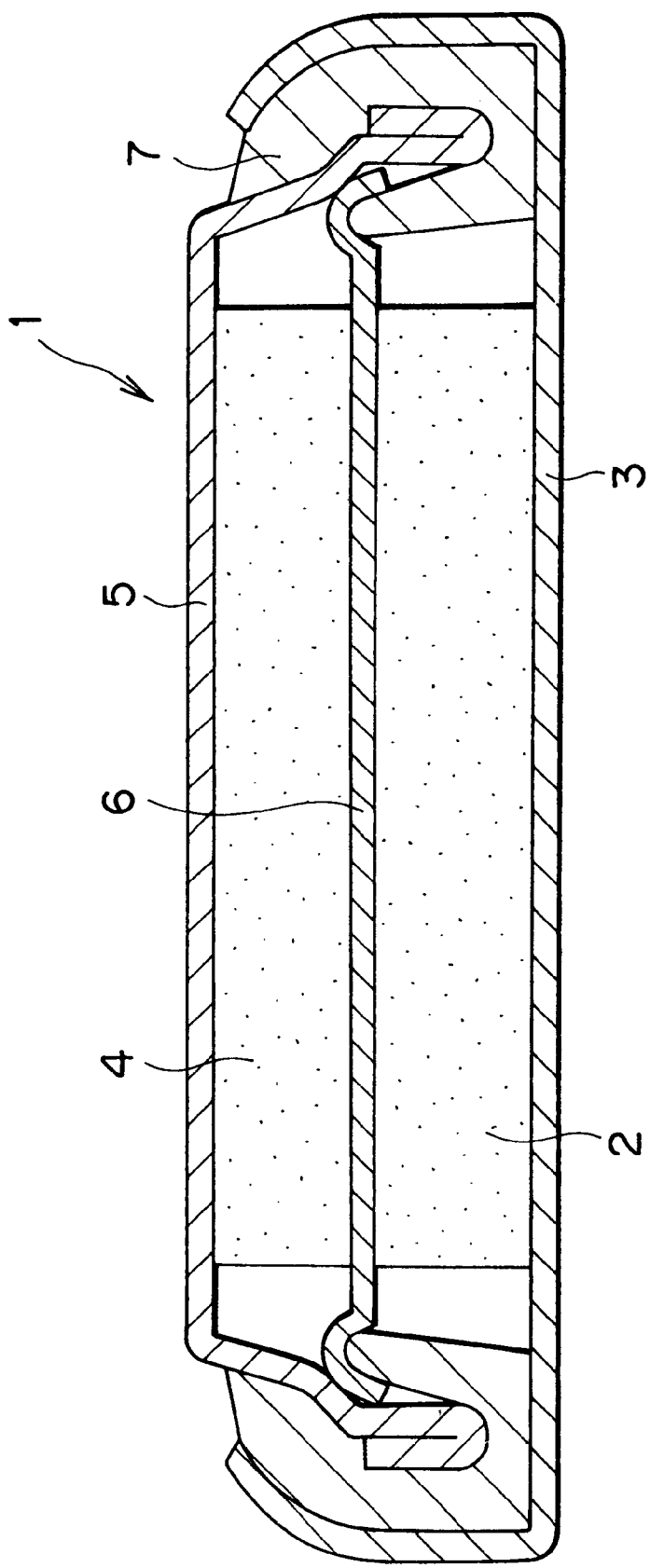

The non-aqueous electrolytic cell according to the present invention is described in detail with reference to the sole FIGURE.

The FIGURE shows a coin-shaped non-aqueous electrolytic secondary cell 1 of the present invention. The cell 1 includes a positive electrode 2, a positive electrode can 3 accommodating the positive electrode 2 therein, a negative electrode 4, a negative electrode can 5 accommodating the negative electrode 4 therein, a separator 6 provided between the positive electrode 2 and the negative electrode 4, and an insulating gasket 7. When a liquid electrolyte is used as an electrolyte, a non-aqueous liquid electrolyte is filled in the positive electrode can 3 and the negative electrode can 5. Where a solid electrolyte or a gel electrolyte is used, a layer of a solid electrolyte or a gel electrolyte is formed on an active material mix layer of the positive electrode 2 or negative electrode 4. The positive electrode active material and negative electrode active material should, respectively, be made of materials capable of reversible doping•de-doping of lithium ions.

Where a conventional non-aqueous electrolytic secondary cell is charged and discharged in a high temperature environment, an active peroxide intermediate is formed within the cell, thereby causing the active materials to be decreased in stability. The peroxide intermediate decomposes a solid electrolyte and a liquid electrolyte and will cause heat to be generated, thereby decreasing the cell stability.

In secondary cell 1 of the present invention, a sulfur compound is added to at least one of an active material mix layer for positive electrode, an active material mix layer for negative electrode, and an electrolyte. Sulfur compounds are usually employed as an antioxidant for preventing deterioration of polymer materials by application of light or heat thereto. When a sulfur compound is added to within the cell, the peroxide intermediate is decomposed and thus the cell is stabilized.

Examples of the sulfur compound include organic sulfur compounds such as distearyl thiodipropionate, thiodipropionic acid, thiodipropionic esters, distearylpentaerythritol diphosphite, dimyristyl-,3,3'-thiodipropionate, mercaptans and the like, and sulfates such as potassium sulfate, sodium sulfate, magnesium sulfate, and sulfites, thiosulfates and the like.

Of these, sulfates are preferred as the sulfur compound. More preferably, potassium sulfate or sodium sulfate is used. These sulfur compounds may be used singly or in combination.

Where the sulfur compound is added to the positive-electrode-mix layer and/or negative-electrode-mix layer, it is preferred to added the sulfur compound in an amount of 0.3 to 15 wt %, more preferably from 0.5 to 5 wt %, based on the positive-electrode-mix layer and/or negative-electrode-mix layer.

If the amount of the sulfur compound is less than 0.3 wt %, the peroxide intermediate formed during the course of charge and discharge under high temperature environmental conditions cannot be decomposed satisfactorily, with the high possibility that a desired effect cannot be obtained.

On the other hand, when the amount of the sulfur compound is larger than 15 wt %, the sulfur compound, which does not contribute to the charge and discharge reactions of the cell and is low in conductivity, may decrease a cell capacity. In addition, when the amount exceeds 15 wt %, the sulfur compound will cause polarization within the positive electrode active material, thus leading to the possibility of degrading a high rate discharge characteristic of the cell.

The average particle size of the sulfur compound should preferably be 50 $\mu$m or below. Where the average size exceeds 50 $\mu$m, the area of contact between the sulfur compound and a peroxide intermediate is not established satisfactorily, with the fear that a desired effect cannot be expected.

The addition of a sulfur compound to a positive-electrode-mix layer is particularly described, for example.

The positive electrode 2 is made of a positive-electrode-mix layer containing such a sulfur compound and a positive electrode active material as mentioned before on a current collector therefor.

The current collector for the positive electrode is made, for example, of an aluminium foil or the like.

The active electrode active material may be ones ordinarily employed as a positive electrode active material of this type of non-aqueous electrolytic secondary cell and includes, for example a transition metal oxide capable of doping•de-doping lithium, and the like. It is preferred to use a lithium•transition metal composite oxide.

Examples of the lithium•transition metal composite oxide include those compounds of the general formulas, $Li_xNi_yM_{1-y}O_{2-\delta}$, $Li_xCo_yM_{1-y}O_{2-\delta}$, $Li_xMn_yM_{1-y}O_{2-\delta}$ and $Li_xFe_yM_{1-y}O_{2-\delta}$ wherein $0<x\leq1.5$, $0\leq y\leq1$, $0\leq\delta\leq0.5$, and M represents at least one member selected from second transition metal elements of Al, Fe, Cu, Co, Cr, Mg, Ca, V, Ni, Ag, Sn, B and Ga, $LiMn_2O_4$, $Li_4Mn_5O_{12}$, and $Li_xMn_{2-y}M_yO_{4-\delta}$ wherein $0<x\leq1.5$, $0\leq y\leq1.5$, $0\leq\delta\leq0.5$, and M represents at least one member selected from second transition metal elements of Al, Fe, Cu, Co, Cr, Mg, Ca, V, Ni, Ag, Sn, B and Ga.

The binder contained in the positive-electrode-mix layer includes known resin materials ordinarily employed as a bonding agent or a binder of a positive-electrode-mix layer of this type of non-aqueous electrolytic secondary cell. The positive-electrode-mix layer may further comprise conductors, known additives and the like, if necessary.

The positive electrode can 3 is provided to accommodate the positive electrode 2 therein and serves as an external terminal (cathode) of the secondary cell 1.

The negative electrode 4 is made of a negative-electrode-mix layer containing an active material for negative electrode and formed on a current collector for negative electrode. The current collector for negative electrode is made, for example, of a foil of copper or nickel or the like.

The negative electrode active material includes materials capable of doping•de-doping lithium, metallic lithium, lithium alloys and the like. These materials may be used singly or in combination.

Examples of the lithium alloy include compounds of the general formula $M_xM'_yLi_z$ wherein M and M' independently represent an element other than Li.

More particularly, mention is made, as M and M', of Al, Mg, B, Ga, In, Si, Ge, Sn, Pb, Sb, Cd, Ag, Zn, Hf, Zr and Y. Of these, it is preferred to use Li alloys made of compounds with Al, Al—M', Si, Si—M', Sn, Sn—M' and the like.

Examples of the material capable of doping•de-doping lithium include carbon materials such as thermally decomposed carbons, cokes, graphites, vitreous carbon fibers, baked bodies of organic polymer compounds, carbon fibers, active carbon and the like, and polymers such as polyacetylene and the like. It will be noted that the baked body of an organic polymer compound is one which is obtained by baking and carbonizing a phenolic resin, a furan resin or the like at an appropriate temperature.

The negative electrode active material may be one which is obtained by mixing such a Li alloy with a carbonaceous material as mentioned above.

The bonding agent or binder contained in the negative-electrode-mix layer may be known resin materials ordinarily employed as a bonding agent or binder in the negative-electrode-mix layer of this type of non-aqueous electrolytic secondary cell.

The negative electrode can 5 is used to accommodate the negative electrode 4 therein and serves as an external terminal (anode) of the secondary cell 1.

The electrolyte may be either a so-called liquid electrolyte, or a solid electrolyte or a gel electrolyte.

Where a liquid electrolyte is used, usable non-aqueous solvents include, for example, propylene carbonate, ethylene carbonate, butylene carbonate, vinylene carbonate, $\gamma$-butyl lactone, sulforane, 1,2-dimethoxyethane, 1,2-diethoxyethane, 2-methyltetrahydrofuran, 1,3-methyl-1,3-dioxorane, methyl propionate, methyl butyrate, dimethyl carbonate, ethylmethyl carbonate, diethyl carbonate, dipropyl carbonate and the like. From the standpoint of voltage stability, it is preferred to use cyclic carbonates such as propylene carbonate, vinylene carbonate and the like, and chain carbonates such as dimethyl carbonate, diethyl carbonate, dipropyl carbonate and the like. The non-aqueous solvents may be used singly or in combination of two or more.

Where a solid electrolyte (including a complete solid electrolyte that is completely free of a solvent) or a gel electrolyte is used, polymer materials used include a silicon gel, an acrylic gel, an acrylonitrile gel, a polyphosphazene-modified polymer, polyethylene oxide, polypropylene oxide, and their composite polymers, crosslinked polymers and modified polymers. Alternatively, fluorine polymers may also be used including, for example, poly(vinylidene fluoride), polyvinylidene fluoride-co-hexafluoropropylene), poly(vinylidene fluoride-co-tetrafluoroethylene), poly(vinylidene fluoride-co-trifluoroethylene), and mixtures thereof. As a matter of course, the electrolytes are not limited those mentioned above.

The light metal salts dissolved in or miscible with the electrolyte include salts of light metals such as lithium, sodium, aluminium and the like and are appropriately selected depending on the type of cell.

For instance, where a lithium ion secondary cell is made, there can be used $LiClO_4$, $LiAsF_6$, $LiBF_4$, $LiPF_6$, $LiCF_3SO_3$, $LiN(C_nF_{2n+1}SO_2)$ and the like, of which $LiBF_4$ and $LiPF_6$ are preferred.

The separator 6 separates the positive electrode 2 and the negative electrode 4 from each other, and may be made of known materials ordinarily used as a separator of this type of non-aqueous electrolytic secondary cell. For instance, a micro-porous polymer membrane made of a polyolefin resin such as polypropylene is used. It should be noted that if a solid electrolyte or a gel electrolyte is used as an electrolyte, this separator 6 may not always be used.

The insulating gasket 7 is integrally assembled with the negative can 5. This insulating gasket 7 is provided to prevent leakage of a non-aqueous liquid electrolyte filled in the positive electrode can 3 and the negative electrode can 5.

The thus arranged non-aqueous electrolytic secondary cell 1 is fabricated in the following manner using, for example, a liquid electrolyte as an electrolyte.

The manner of making the positive electrode 2 is as follows. A sulfur compound, a positive electrode active material and a binder is dispersed in a solvent to prepare a mixture for positive electrode in the form of a slurry.

Next, the positive electrode mixture, to which the sulfur compound has been added, is uniformly applied onto a current collector and dried. In this way, the positive electrode 2 having the positive-electrode-mix layer having the sulfur compound added thereto is made.

The manner of making the negative electrode 4 is as follows. A negative electrode active material and a binder are dispersed in a solvent to prepare a mixture for negative electrode in the form of a slurry. Next, the thus obtained mixture is uniformly applied onto a current collector and dried to provide the negative electrode 4 having a negative-electrode-mix layer formed thereon.

The non-aqueous liquid electrolyte is prepared by dissolving an electrolytic salt in a non-aqueous solvent.

The positive electrode 2 is accommodated in a positive electrode can 3, and the negative electrode 4 is accommodated in a negative electrode can 5. A separator 6 is provided between the positive electrode 2 and the negative electrode 4. The non-aqueous liquid electrolyte is charged into the positive electrode can 3 and the negative electrode can 5, respectively, followed by fixing the positive electrode can 3 and the negative electrode can 5 interposing an insulating gasket 7 by caulking, thereby completing the non-aqueous electrolytic secondary cell 1.

In the thus fabricated non-aqueous electrolytic secondary cell 1, the sulfur compound is added to the positive-electrode-mix layer. Accordingly, the sulfur compound decomposes the peroxide intermediate formed in the cell and thus, the non-aqueous electrolytic secondary cell 1 is stabilized. Where the cell is charged and discharged in a high temperature environment, the cell has excellent stability and a high cell capacity.

In this non-aqueous electrolytic secondary cell 1, the sulfur compound is in the form of a sulfate, so that a high cell capacity is obtained.

Moreover, in this non-aqueous electrolytic secondary cell 1, the sulfur compound is added to the positive-electrode-mix layer in an amount of 0.3 to 15 wt % of the layer, so that an optimal cell capacity as a cell is obtained.

In addition, the sulfur compound has an average particle size of 50 μm or below, which is sufficient to decompose the peroxide intermediate. Thus, the positive electrode active material is more stabilized with more excellent high temperature durability being shown. Accordingly, the non-aqueous electrolytic secondary cell 1 to which the sulfur compound has been added, has very excellent stability.

Although, in the non-aqueous electrolytic secondary cell 1 described above, only the case where the sulfur compound is added to the positive-electrode-mix layer has been explained, it should be noted that the non-aqueous electrolytic cell according to the present invention may include a sulfur compound added to a negative-electrode-mix layer or an electrolyte.

It will be noted that such a non-aqueous electrolytic cell as set out above is not critical with respect to its shape and may take a cylindrical, square, coin-shaped, button-shaped or the like form. In addition, the cell may be of the inside out type, a spirally coiled type formed by laminating an elongated positive electrode and an elongated negative electrode and by winding a formed laminate electrodes, or a built-up type and can be in any cell size and includes a thin type, a large-sized type or the like. The non-aqueous electrolytic cell may be formed even as a primary cell.

The present invention is more particularly described by way of examples based on experimental results.

Experiment 1

In Experiment 1, a plurality of secondary cells were made using a positive electrode having a positive-electrode-mix layer, to which a sulfur compound had been added, a negative electrode and an electrolyte in order to evaluate the stability and capacity of the non-aqueous electrolytic secondary cell depending on the type of the sulfur compound added to the positive-electrode-mix layer.

EXAMPLE 1

A positive electrode was made in the following manner.

Lithium•cobalt composite oxide ($LiCoO_2$) was prepared and provided as a positive electrode active material. For the preparation of the lithium•cobalt composite oxide, a mixture of cobalt oxide (2 moles) and lithium carbonate (3 moles) was calcined in air at 900° C. for 5 hours to provide $LiCoO_2$.

Potassium sulfate was used as the sulfur compound. It will be noted that the crystals of potassium sulfate were milled in a ball mill for 5 hours and passed through a screen having a mesh size of 50 μm to provide a powder having an average particle size of 10 μm.

$LiCoO_2$ (85 wt %) and potassium sulfate (1 wt %), both prepared in the manners as set out above, graphite (10 wt %) used as a conductor, and polyvinylidene fluoride (4 wt %) used as a binder were mixed with one another and dispersed in N-methyl-2-pyrrolidone to provide a slurry mixture for positive electrode.

This positive electrode mixture was uniformly applied onto a 20 μm thick aluminium foil (i.e. a current collector for positive electrode) and dried to form a positive-electrode-mix layer, followed by compression with a roller press and punching into a given size to provide a positive electrode. The packing density of the positive electrode was measured and found to be at 3.4 $g/cm^3$.

Next, a negative electrode was made in the following manner.

A powdery artificial graphite (90 wt %) used as a negative electrode active material, and polyvinylidene fluoride (10 wt %) used as a binder were mixed and dispersed in N-methyl-2-pyrrolidone to provide a slurry mixture for negative electrode.

The mixture was uniformly applied onto a 10 μm thick copper foil (i.e. a current collector for negative electrode) and dried to form a negative-electrode-mix layer, followed by compression with a roller press and stamping out into a given size to provide a negative electrode.

The thus obtained positive electrode was accommodated in a positive electrode can, and the negative electrode was accommodated in a negative electrode can, after which a separator made of a micro-porous polypropylene film was interposed between the positive electrode and the negative electrode. A non-aqueous liquid electrolyte was charged, as an electrolyte, into the positive electrode can and the negative electrode can, respectively. The positive electrode can and the negative electrode can were fixedly caulked to provide a coin-shaped test cell. The non-aqueous liquid electrolyte was prepared by dissolving 1 mol/liter of $LiPF_6$ in a mixed solvent of equal amounts by volume of propylene carbonate and dimethyl carbonate.

EXAMPLE 2

The general procedure of Example 1 was repeated except that sodium sulfate was used as a sulfur compound, thereby making a coin-shaped test cell.

EXAMPLE 3

The general procedure of Example 1 was repeated except that potassium sulfite was used as a sulfur compound, thereby making a coin-shaped test cell.

EXAMPLE 4

The general procedure of Example 1 was repeated except that sodium thiosulfate was used as a sulfur compound, thereby making a coin-shaped test cell.

EXAMPLE 5

The general procedure of Example 1 was repeated except that lithium sulfate was used as a sulfur compound, thereby making a coin-shaped test cell.

EXAMPLE 6

The general procedure of Example 1 was repeated except that magnesium sulfate was used as a sulfur compound, thereby making a coin-shaped test cell.

EXAMPLE 7

The general procedure of Example 1 was repeated except that distearyl thiodipropionate (hereinafter referred to simply as DSTDP) was used as a sulfur compound, thereby making a coin-shaped test cell.

Comparative Example 1

The general procedure of Example 1 was repeated except that 86 wt % of $LiCoO_2$ was used as a positive electrode active material without addition of a sulfur compound, thereby making a coin-shaped test cell.

The respective test cells fabricated in a manner as set out above were charged under conditions of a charge voltage of 4.20 V, a charge current of 1 mA and a charge time of 15 hours. Thereafter, each cell was discharged, followed by measurement of a discharge capacity.

The test cells after completion of the charging were each disassembled to take out a positive electrode, and the electrode was subjected to differential scanning calorimetric measurement along with the liquid electrolyte, from which a calorific value and a heat generation commencing temperature were determined under heating conditions. The device used for the differential scanning calorimetric measurement was commercially available from Seiko Electronic Ind. CO., Ltd., under the commercial name of DSC220U.

The results of the measurements of the test cells of Examples 1 to 7 and Comparative Example 1 with respect to the discharge capacity, calorific value and heat generation commencing temperature are shown in Table 1.

TABLE 1

| | Sulfur compound | Discharge capacity (mAh) | Calorific value (J/g) | Heat generation commencing temperature (° C.) |
|---|---|---|---|---|
| Example 1 | Potassium sulfate | 7.53 | 450 | 195 |
| Example 2 | Sodium sulfate | 7.48 | 480 | 199 |
| Example 3 | Potassium sulfite | 6.75 | 510 | 187 |
| Example 4 | Sodium thiosulfate | 6.80 | 470 | 190 |
| Example 5 | Lithium sulfate | 6.90 | 450 | 196 |
| Example 6 | Magnesium sulfate | 7.09 | 520 | 185 |
| Example 7 | DSTDP | 6.81 | 440 | 190 |
| Comparative Example 1 | Not added | 7.57 | 781 | 168 |

As will be apparent from the results of Table 1, the cells of Examples 1 to 7 using the positive electrode active materials to which sulfur compounds are added are high in the discharge capacity, small in the calorific value under heating conditions, and high in the heat generation commencing temperature.

On the other hand, with the cell of Comparative Example 1 having the positive-electrode-mix layer to which no sulfur compound is added, it will be seen that although the discharge capacity is high, the calorific value is too high under heating conditions and the heat generation commencing temperature is low.

Further, it will be seen that the cells of Examples 1 to 6 wherein sulfates are used as a sulfur compound has a discharge capacity held higher than the cell of Example 7 wherein the organic sulfur compound is used as a sulfur compound.

Moreover, it will be found that the cell of Example 1 wherein potassium sulfate is used as a sulfate and the cell of Example 2 using sodium sulfate, respectively, exhibit a discharge capacity that is kept at a very high level.

In view of the foregoing, it will be appreciated that sulfates can be preferably used as a sulfur compound, of which potassium sulfate or sodium sulfate is more preferred.

Experiment 2

In Experiment 2, a plurality of non-aqueous electrolytic secondary cells were made wherein the amount of a sulfur compound added to a positive-electrode-mix layer was changed, and the stability and capacity of the non-aqueous electrolytic secondary cell depending on the amount was evaluated.

EXAMPLE 8

The general procedure of Example 1 was repeated except that potassium sulfate was added to in an amount of 0.1 wt % and the content of the positive electrode active material was at 85.9 wt %, thereby making a coin-shaped test cell.

EXAMPLE 9

The general procedure of Example 1 was repeated except that the amount of potassium sulfate was at 0.3 wt %, and the content of the positive electrode active material was at 85.7 wt %, thereby making a coin-shaped test cell.

EXAMPLE 10

The general procedure of Example 1 was repeated except that the amount of potassium sulfate was at 5 wt %, and the content of the positive electrode active material was at 81 wt %, thereby making a coin-shaped test cell.

EXAMPLE 11

The general procedure of Example 1 was repeated except that the amount of potassium sulfate was at 10 wt %, and the content of the positive electrode active material was at 76 wt %, thereby making a coin-shaped test cell.

EXAMPLE 12

The general procedure of Example 1 was repeated except that the amount of potassium sulfate was at 15 wt %, and the content of the positive electrode active material was at 71 wt %, thereby making a coin-shaped test cell.

EXAMPLE 13

The general procedure of Example 1 was repeated except that the amount of potassium sulfate was at 20 wt %, and the content of the positive electrode active material was at 66 wt %, thereby making a coin-shaped test cell.

EXAMPLE 14

The general procedure of Example 2 was repeated except that the amount of sodium sulfate was at 0.1 wt %, and the content of the positive electrode active material was at 85.9 wt %, thereby making a coin-shaped test cell.

EXAMPLE 15

The general procedure of Example 2 was repeated except that the amount of sodium sulfate was at 0.3 wt %, and the content of the positive electrode active material was at 85.7 wt %, thereby making a coin-shaped test cell.

EXAMPLE 16

The general procedure of Example 2 was repeated except that the amount of sodium sulfate was at 5 wt %, and the content of the positive electrode active material was at 81 wt %, thereby making a coin-shaped test cell.

EXAMPLE 17

The general procedure of Example 2 was repeated except that the amount of sodium sulfate was at 10 wt %, and the content of the positive electrode active material was at 76 wt %, thereby making a coin-shaped test cell.

EXAMPLE 18

The general procedure of Example 2 was repeated except that the amount of sodium sulfate was at 15 wt %, and the content of the positive electrode active material was at 71 wt %, thereby making a coin-shaped test cell.

EXAMPLE 19

The general procedure of Example 2 was repeated except that the amount of sodium sulfate was at 20 wt %, and the content of the positive electrode active material was at 66 wt %, thereby making a coin-shaped test cell.

The thus made test cells of Examples 8 to 19 were subjected to measurements of discharge capacity, calorific value and heat generation commencing temperature in the same manner as set forth hereinbefore. The results of the measurements and the amount of the sulfur compounds are shown in Table 2 below.

TABLE 2

| | Sulfur compound | Amount (wt %) | Discharge capacity (mAh) | Calorific value (J/g) | Heat generation commencing temperature (° C.) |
| --- | --- | --- | --- | --- | --- |
| Example 8 | Potassium | 0.1 | 7.58 | 780 | 171 |
| Example 9 | sulfate | 0.3 | 7.53 | 510 | 193 |
| Example 10 | | 5 | 7.33 | 450 | 202 |
| Example 11 | | 10 | 7.14 | 420 | 201 |
| Example 12 | | 15 | 6.85 | 410 | 202 |
| Example 13 | | 20 | 5.92 | 400 | 205 |
| Example 14 | Sodium | 0.1 | 7.60 | 790 | 173 |
| Example 15 | sulfate | 0.3 | 7.53 | 520 | 188 |
| Example 16 | | 5 | 7.29 | 460 | 199 |
| Example 17 | | 10 | 7.09 | 460 | 200 |
| Example 18 | | 15 | 6.83 | 450 | 202 |
| Example 19 | | 20 | 5.96 | 430 | 202 |

As will be apparent from the results of Table 2, the comparison between Examples 8 and Example 14 and also between Example 9 and Example 15 reveals that the cells of Examples 9 and 15 wherein the amount of the sulfur compounds is at 0.3 wt % based on the positive-electrode-mix layer are smaller in the calorific value and higher in the heat generation commencing temperature than the cells of Examples 8 and 14 wherein the amount of the sulfur compounds is smaller than 0.3 wt %.

Likewise, the comparison between Examples 12 and 18 and also between Examples 13 and 19 reveals that the cells of Examples 12, 18 where the sulfur compounds are each added in an amount of 15 wt % relative to the positive-electrode-mix layer is smaller in the decreasing of discharge capacity that the cells of Examples 13, 19 wherein the sulfur compounds are each added in an amount of greater than 15 wt %.

From this, it will be appreciated that when the sulfur compounds are added to within a range of 0.3 to 15 wt % relative to the positive-electrode-mix layer, the resulting non-aqueous electrolytic secondary cells are imparted with a high discharge capacity wherein the positive electrode active material is stabilized.

Experiment 3

In Experiment 3, a plurality of non-aqueous electrolytic secondary cells were made while changing the average particle size of the sulfur compound added to positive-electrode-mix layers in order to evaluate the stability and capacity of the secondary cell depending on the average particle size of the sulfur compound. Sulfates were used as a sulfur compound.

EXAMPLE 20

The general procedure of Example 1 was repeated except that the milling time of the crystals of potassium sulfate was shortened and the resulting powder was passed through a sieve having a mesh size of 75 µm to obtain a potassium sulfate powder having an average size of 43 µm, thereby obtaining a test cell.

EXAMPLE 21

The general procedure of Example 1 was repeated except that the milling time of the crystals of potassium sulfate was shortened, followed by passing through a sieve having a mesh size of 100 µm to obtain a potassium sulfate powder having an average size of 61 µm, thereby obtaining a test cell.

EXAMPLE 22

The general procedure of Example 1 was repeated except that the milling time of the crystals of potassium sulfate was shortened, followed by passing through a sieve having a mesh size of 150 µm to obtain a potassium sulfate powder having an average size of 93 µm, thereby obtaining a test cell.

EXAMPLE 23

The general procedure of Example 2 was repeated except that the milling time of the crystals of sodium sulfate was shortened, followed by passing through a sieve having a mesh size of 75 µm to obtain a sodium sulfate powder having an average size of 44 µm, thereby obtaining a test cell.

EXAMPLE 24

The general procedure of Example 2 was repeated except that the milling time of the crystals of sodium sulfate was shortened, followed by passing through a sieve having a mesh size of 100 µm to obtain a sodium sulfate powder having an average size of 61 µm, thereby obtaining a test cell.

EXAMPLE 25

The general procedure of Example 2 was repeated except that the milling time of the crystals of sodium sulfate was shortened, followed by passing through a sieve having a mesh size of 150 µm to obtain a sodium sulfate powder having an average size of 92 µm, thereby obtaining a test cell.

The thus made test cells of Examples 20 to 25 were subjected to measurements of discharge capacity, calorific value and heat generation commencing temperature in the same manner as set forth hereinbefore. The results of the measurements and the average particle size are shown in Table 3. The results of the measurements in Examples 1, 2 are also shown in the table.

TABLE 3

| | Sulfur compound | Average size (µm) | Discharge capacity (mAh) | Calorific value (J/g) | Heat generation commencing temperature (° C.) |
|---|---|---|---|---|---|
| Example 1 | Potassium sulfate | 10 | 7.53 | 450 | 195 |
| Example 20 | | 43 | 7.55 | 480 | 193 |
| Example 21 | | 61 | 7.53 | 750 | 179 |
| Example 22 | | 93 | 7.57 | 780 | 175 |
| Example 2 | Sodium sulfate | 10 | 7.48 | 480 | 199 |
| Example 23 | | 44 | 7.50 | 490 | 192 |
| Example 24 | | 61 | 7.58 | 730 | 176 |
| Example 25 | | 92 | 7.53 | 780 | 174 |

As will be apparent from the results of Table 3, the cells of Examples 20, 23 wherein the average particle size of the sulfur compounds is smaller than 50 µm are smaller in the calorific value and higher in the heat generation commencing temperature than the cells of Examples 21, 24 wherein the average particle size of the sulfur compounds is larger than 50 µm.

This is considered for the reason that when the sulfur compounds have an average particle size of 50 µm or below, a satisfactory area of contact with a peroxide intermediate is established, so that the peroxide intermediate can be more reliably decomposed and the cell stability is more improved.

Accordingly, it is preferred to add a sulfur compound in the form of particles having an average size of 50 µm or below to the positive-electrode-mix layer whereby the secondary cell is more improved in stability under high temperature conditions.

Experiment 4

In Experiment 4, a plurality of non-aqueous electrolytic secondary cells were made while changing an amount of a sulfur compound added to a negative-electrode-mix layer in order to evaluate the stability and capacity of the secondary cell depending on the amount of the sulfur compound.

EXAMPLE 26

The general procedure of Example 1 was repeated except that a mixture for positive electrode comprising $LiCoO_2$ (86 wt %) used as a positive electrode active material, graphite (10 wt %) used as a conducting agent, and polyvinylidene fluoride (4 wt %) used as a binder was applied onto a current collector for positive electrode to form a positive-electrode-mix layer and that a mixture for negative electrode comprising powdery artificial graphite (89.9 wt %) used as a negative electrode active material, potassium sulfate (0.1 wt %) used as a sulfur compound and polyvinylidene fluoride (10 wt %) used as a binder was applied onto a current collector for negative electrode to form a negative-electrode-mix layer, thereby making a coin-shaped test cell.

EXAMPLE 27

The general procedure of Example 26 was repeated except that the amount of potassium sulfate was at 0.3 wt % and the content of the negative electrode active material was at 85.7 wt %, thereby making a coin-shaped test cell.

EXAMPLE 28

The general procedure of Example 26 was repeated except that the amount of potassium sulfate was at 1 wt % and the content of the negative electrode active material was at 85 wt %, thereby making a coin-shaped test cell.

EXAMPLE 29

The general procedure of Example 26 was repeated except that the amount of potassium sulfate was at 5 wt % and the content of the negative electrode active material was at 81 wt %, thereby making a coin-shaped test cell.

EXAMPLE 30

The general procedure of Example 26 was repeated except that the amount of potassium sulfate was at 10 wt % and the content of the negative electrode active material was at 76 wt %, thereby making a coin-shaped test cell.

EXAMPLE 31

The general procedure of Example 26 was repeated except that the amount of potassium sulfate was at 15 wt % and the content of the negative electrode active material was at 71 wt %, thereby making a coin-shaped test cell.

EXAMPLE 32

The general procedure of Example 26 was repeated except that the amount of potassium sulfate was at 20 wt % and the content of the negative electrode active material was at 66 wt %, thereby making a coin-shaped test cell.

The thus made test cells of Examples 26 to 32 were, respectively, subjected to measurements of discharge capacity, calorific value and heat generation commencing temperature in the same manner as set forth before.

The results of the measurements and the amount of potassium sulfate relative to the negative-electrode-mix layer are shown in Table 4.

TABLE 4

|  | Amount (wt %) | Discharge capacity (mAh) | Calorific value (J/g) | Heat generation commencing temperature (° C.) |
| --- | --- | --- | --- | --- |
| Example 26 | 0.1 | 7.59 | 770 | 170 |
| Example 27 | 0.3 | 7.58 | 530 | 189 |
| Example 28 | 1 | 7.53 | 480 | 191 |
| Example 29 | 5 | 7.30 | 480 | 195 |
| Example 30 | 10 | 7.09 | 460 | 195 |
| Example 31 | 15 | 7.00 | 450 | 200 |
| Example 32 | 20 | 4.88 | 430 | 201 |

As will be apparent from the results of Table 4, the comparison between Example 26 and Example 27 reveals that the cell of Example 27 wherein the amount of the sulfur compound is 0.3 wt % relative to the negative-electrode-mix layer is smaller in the calorific value and higher in the heat generation commencing temperature than the cell of Example 26 wherein the amount of the sulfur compound is smaller than 0.3 wt % relative to the negative-electrode-mix layer.

Further, the comparison between Example 31 and Example 32 reveals that the cell of Example 31 wherein the amount of the sulfur compound relative to the negative-electrode-mix layer is at 15 wt % is smaller in the decreasing of the discharge capacity than the cell of Example 32 wherein the amount of the sulfur compound relative to the negative-electrode-mix layer was greater than 15 wt %.

From the above description, it will be seen that when the sulfur compound is added to the negative-electrode-mix layer, the non-aqueous electrolytic secondary cells are very stable under charge conditions or in a high temperature environment, like the case where the sulfur compound is added to the positive-electrode-mix layer. In addition, it has been found that the addition of the sulfur compound to the negative-electrode-mix layer within a range of 0.3 to 15 wt % leads to a higher discharge capacity and higher stability.

As will be seen from the foregoing, the non-aqueous electrolytic cell according to the invention comprises a sulfur compound added to at least one of a positive-electrode-mix layer, a negative-electrode-mix layer and an electrolyte, so that when the cell is charged and discharged under high temperature environmental conditions, a high discharge capacity is ensured along with high stability.

What is claimed is:

1. A non-aqueous electrolytic cell, which comprises:
   (1) a positive electrode having a positive electrode active material layer containing at least a positive electrode active material capable of doping and de-doping lithium;
   (2) a negative electrode having a negative electrode active material layer containing at least a lithium-containing negative electrode active material; and
   (3) a non-aqueous electrolyte,
   wherein,
      a sulfur compound is present within a range of 0.3 to 15 wt % in at least one of said positive electrode active material layer and said negative electrode active material layer.

2. A non-aqueous electrolytic cell according to claim 1, wherein said positive electrode active material and said negative electrode active material are, respectively, made of a material capable of reversible doping and de-doping of lithium.

3. A non-aqueous electrolytic cell according to claim 2, wherein said positive electrode active material comprises a lithium/transition metal composite oxide.

4. A non-aqueous electrolytic cell according to claim 3, wherein said positive electrode active material consists of a compound selected from the group consisting of compounds of the formulas, $Li_xNi_yM_{1-y}O_{2-\delta}$ $Li_xCo_yM_{1-y}O_{2-\delta}$ $Li_xMn_yM_{1-y}O_{2-\delta}$ and $Li_xFe_xM_{1-y}O_{2-\delta}$ wherein $0<x\leq1.5$, $0\leq y\leq1$, $0\leq\delta\leq0.5$, and M represents at least one member selected from second transition metal elements of Al, Fe, Cu, Co, Cr, Mg, Ca, V, Ni, Ag, Sn, B and Ga, $LiMn_2O_4$, $Li_4Mn_5O_{12}$, and $Li_xMn_{2-y}M_yO_{4-\delta}$ wherein $0<x\leq1.5$, $0\leq y\leq1.5$, $0\leq\delta\leq0.5$, and M represents at least one member selected from second transition metal elements of Al, Fe, Cu, Co, Cr, Mg, Ca, V, Ni, Ag, Sn, B and Ga.

5. A non-aqueous electrolytic cell according to claim 4, wherein said cell is provided with an elongated positive electrode which has a positive-electrode-mix layer containing, at least, said positive electrode active material, formed on the surface of a positive electrode collector comprised of a metallic foil, and an elongated negative electrode which has a negative-electrode-mix layer formed on the surface of a negative electrode collector comprised of a metallic foil.

6. A non-aqueous electrolytic cell according to claim 2, wherein said negative electrode active material is a member selected from the group consisting of cracked carbons, cokes, graphites, vitreous carbon fibers, a baked body of an organic polymer compound, carbon fibers, and conductive polymers such as polyacetylene.

7. A non-aqueous electrolytic cell according to claim 6, wherein said negative electrode active material consists of a carbon material.

8. A non-aqueous electrolytic cell according to claim 7, wherein said cell is provided with an elongated negative electrode which has a negative-electrode-mix layer containing, at least, said negative electrode active material, formed on the surface of a negative electrode collector comprised of a metallic foil, and an elongated positive electrode which has a positive-electrode-mix layer formed on the surface of a positive electrode collector comprised of a metallic foil.

9. A non-aqueous electrolytic cell according to claim 1, wherein said sulfur compound is in the form of particles having an average size of 50 μm or below.

10. A non-aqueous electrolytic cell according to claim 1, wherein said sulfur compound is a member selected from the group consisting of distearyl thiodipropionate, thiodipropionic acid, thiodipropionic ester, distearylpentaerythritol diphosphite, dimyristyl-3,3'-thiodipropionate and a mercaptan.

11. A non-aqueous electrolytic cell according to claim 1, wherein said sulfur compound consists of a sulfate.

12. A non-aqueous electrolytic cell according to claim 11, wherein said sulfate consists of potassium sulfate or sodium sulfate.

13. A non-aqueous electrolytic cell according to claim 1, wherein said sulfur compound is a member selected from the group consisting of potassium, sodium and magnesium sulfates, potassium, sodium and magnesium sulfites, and potassium, sodium and magnesium thiosulfates.

14. A non-aqueous electrolytic cell according to claim 1, wherein said non-aqueous electrolyte is a member selected from the group consisting of a non-aqueous liquid electrolyte, a solid electrolyte and a gel electrolyte.

15. A non-aqueous electrolytic cell according to claim 14, wherein said non-aqueous electrolyte consists of a non-aqueous liquid electrolyte comprising, as a non-aqueous solvent, a member selected from the group consisting of propylene carbonate, ethylene carbonate, butylene carbonate, vinylene carbonate, γ-butyl lactone, sulforane, 1,2-dimethoxyethane, 1,2-diethoxyethane, 2-methyltetrahydrofuran, 1,3-methyl-1,3-dioxorane, methyl propionate, methyl butyrate, dimethyl carbonate, ethylmethyl carbonate, diethyl carbonate, dipropyl carbonate and mixtures thereof.

16. A non-aqueous electrolytic cell according to claim 15, wherein said non-aqueous solvent consists of a mixed solvent of a cyclic carbonate selected from the group consisting of propylene carbonate, ethylene carbonate and vinylene carbonate and a chain carbonate selected from the group consisting of dimethyl carbonate, diethyl carbonate and dipropyl carbonate.

17. A non-aqueous electrolytic cell according to claim 16, wherein said non-aqueous solvent consists of a mixed solvent of propylene carbonate and dimethyl carbonate.

18. A non-aqueous electrolytic cell according to claim 17, wherein said non-aqueous electrolyte consists of a liquid electrolyte, in said mixed solvent, of an electrolyte selected from the group consisting of $LiClO_4$, $LiAsF_6$, $LiBF_4$ and $LiPF_6$.

19. A non-aqueous electrolytic cell according to claim 18, wherein said electrolyte consists of $LiPF_6$.

20. A non-aqueous electrolytic cell according to claim 14, wherein said non-aqueous electrolyte consists of a gel electrolyte selected from the group consisting of a polyphosphazene-modified polymer, polyethylene oxide, polypropylene oxide and composite or crosslinked or modified polymers thereof, poly(vinylidene fluoride), poly(vinylidene fluoride-co-hexafluoropropylene), poly(vinylidene fluoride-co-tetrafluoroethylene), poly(vinylidene fluoride-co-trifluoroethylene) and mixtures thereof.

21. A non-aqueous electrolytic cell according to claim 20, wherein said gel electrolyte comprises a lithium salt selected from the group consisting of $LiClO_4$, $LiAsF_6$, $LiBF_4$ and $LiPF_6$ and dissolved therein or miscibilized therewith.

22. A non-aqueous electrolytic cell according to claim 21, wherein said cell is provided with said gel electrolyte, an elongated positive electrode which has a positive-electrode-mix layer containing, at least, said positive electrode active material, formed on the surface of a positive electrode collector comprised of a metallic foil, and an elongated negative electrode which has a negative-electrode-mix layer formed on the surface of a negative electrode collector comprised of a metallic foil.

* * * * *